US007315523B2

(12) United States Patent
Cai et al.

(10) Patent No.: US 7,315,523 B2
(45) Date of Patent: Jan. 1, 2008

(54) APPARATUS AND METHOD FOR NEIGHBOR ASSISTED COMBINING FOR MULTICAST SERVICES

(75) Inventors: Zhijun Cai, N. Richland Hills, TX (US); Mansoor Ahmed, Fort Worth, TX (US); Robert M. Harrison, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 185 days.

(21) Appl. No.: 11/248,313

(22) Filed: Oct. 12, 2005

(65) Prior Publication Data

US 2007/0081480 A1 Apr. 12, 2007

(51) Int. Cl.
*H04H 1/00* (2006.01)
(52) U.S. Cl. ...................... 370/312; 455/503
(58) Field of Classification Search ............... 370/312, 370/270; 455/503
See application file for complete search history.

(56) References Cited

U.S. PATENT DOCUMENTS

2004/0229624 A1 11/2004 Cai et al.
2006/0165156 A1* 7/2006 Kanemoto et al. .......... 375/145
2007/0081481 A1* 4/2007 Cai et al. .................... 370/312

FOREIGN PATENT DOCUMENTS

GB 2341757 A 3/2000

OTHER PUBLICATIONS

"Universal Mobile Telecommunications System (UMTS); Introduction of the Multimedia Broadcast/Multicast Service (MBMS) in the Radio Access Network (RAN); Stage 2" (3GPP TS 25.346 version 6.6.0 Release 6), ETSI TS 125 346 V6.6.0 (Sep. 2005) Technical Specification), XP014031939.

* cited by examiner

Primary Examiner—Lee Nguyen
(74) Attorney, Agent, or Firm—Gary J. Cunningham

(57) ABSTRACT

A method and apparatus for neighbor assisted combining for localized multicast services. User equipment is sent a signal indicating the relationship between cells with respect to serving cells transmitting a common multicast transmission. At least a portion of the common multicast transmission is transmitted on the same resource on each serving cell. A pilot signal is transmitted on each serving cell, the pilot signal related to the at least a portion of the common multicast transmission on each serving cell. An interfering signal and a related pilot are transmitted on at least one different cell from the serving cells.

18 Claims, 8 Drawing Sheets

APPARATUS AND METHOD FOR NEIGHBOR ASSISTED COMBINING FOR MULTICAST SERVICES

BACKGROUND

1. Field

The present disclosure is directed to a method and apparatus for neighbor assisted combining for localized multicast services. More particularly, the present disclosure is directed to establishing at least one serving cell and at least one extended serving cell for broadcast and multicast services.

2. Description of Related Art

Presently, to deliver a multicast/broadcast stream in the Radio Access network (RAN) efficiently, two possible methods can be used. One is simulcast and the other is localized multicast. In simulcast mode, a Multimedia Broadcast Multicast Service (MBMS) service area is identical to the RAN system coverage area. All the cells broadcast the same data using the same resource. In Orthogonal Frequency Division Multiplexing (OFDM) based Enhanced MBMS (EMBMS), this could minimize the inter-cell interference if the allocated resource element (RE) is identical, which can maximize the Bits/Hz. For a service with very large number of users and the service is widely distributed in the RAN, simulcast can be an efficient way to go. For example, simulcast can be useful for transmission of weather reports, music, movies, etc.

Simulcast is not efficient if the service area is much smaller than the system coverage area. For example, if the service is mostly focused in selected multiple cells, such as for clip replay for football stadiums, sport centers, local weather reports, or the like, it is not good to turn on all the cells in the system to deliver the localized service to just the selected cells. Most of the MBMS service may fall into this category of localized MBMS. In other words, simulcast is not an efficient way to maximize the Bits/Hz/km². For the localized MBMS service, counting can be applied to determine the user status of the cells, such as to determine which cells contain users who desire the service. Then an efficient radio bearer will be established in the appropriate cells to deliver the stream.

Unfortunately, during a localized multicast session, neighboring cells interfere with the localized service area cells. For example, neighbor cells may transmit on the same resource element as the serving cells, which will interfere with the common multicast transmission. Thus, there is a need for a method and apparatus for neighbor assisted combining for localized multicast services.

SUMMARY

A method and apparatus for neighbor assisted combining for localized multicast services. Cells are determined in which user equipment reside that desire a common multicast service. At least one serving cell for transmitting the common multicast service is selected based on the determination. At least one extended serving cell is selected from at least one serving cell neighbor cell which does not have user equipment that desire the common multicast service, the extended serving cell influencing transmissions on the serving cell. The common multicast service is transmitted on the selected at least one serving cell.

BRIEF DESCRIPTION OF THE DRAWINGS

The embodiments of the present disclosure will be described with reference to the following figures, wherein like numerals designate like elements, and wherein.

DETAILED DESCRIPTION

Figure 1:
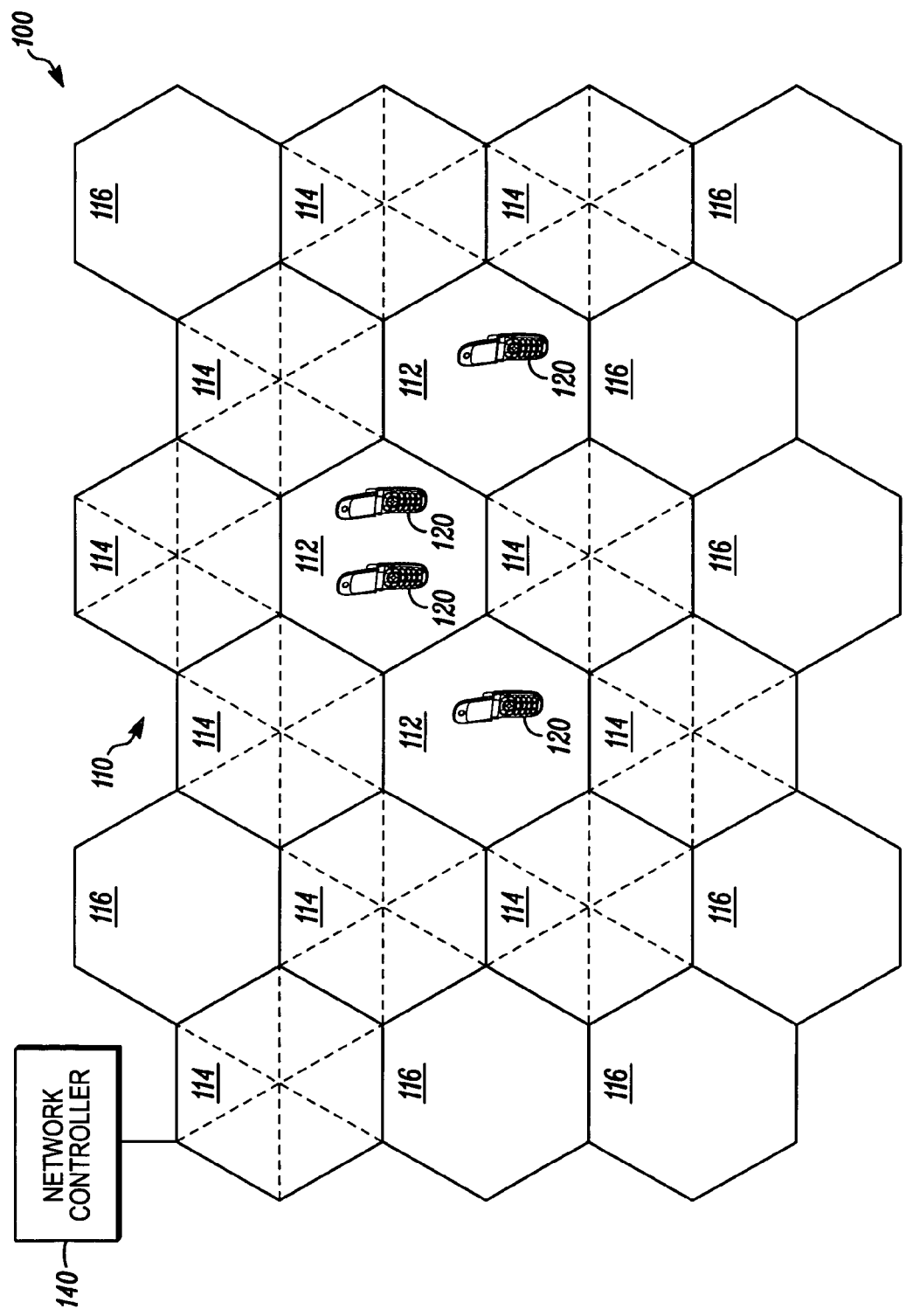
FIG. 1 is an exemplary block diagram of a system according to one embodiment.

FIG. 1 is an exemplary block diagram of a system 100 according to one embodiment. The system 100 can include a network controller 140, a network 110, and at least one terminal 120. The terminal 120 may be a wireless communication device, such as a wireless telephone, a cellular telephone, a personal digital assistant, a pager, a personal computer, a selective call receiver, or any other device that is capable of sending and receiving communication signals on a network including wireless network. The network can include cells 112, 114, and 116. These cells can include serving cells 112 and extended serving cells 114.

In an exemplary embodiment, the network controller 140 is connected to the network 110. The controller 140 may be located at a base station, at a radio network controller, at a multicast transmission server, anywhere else on the network 110, and/or may be distributed throughout various resources on the network 110. The network 110 may include any type of network that is capable of sending and receiving signals, such as wireless signals. For example, the network 110 may include a wireless telecommunications network, a cellular telephone network, a satellite communications network, and other like communications systems. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

In operation, the controller 140 can determine cells 112 in which user equipment, such as terminals 120, reside that desire a common multicast service. The controller 140 can select at least one serving cell 112 for transmitting the common multicast service where the selection can be based on the determination. The controller 140 can select at least one extended serving cell 114 from at least one serving cell neighbor cell which does not have user equipment that desires the common multicast service, the extended serving cell 114 influencing transmissions on the serving cell 112.

The controller 140 can transmit the common multicast service on the selected at least one serving cell 112.

According to a related embodiment, the controller 140 can signal to user equipment, such as terminals 120, a signal indicating the relationship between cells with respect to the serving cells 112 transmitting a common multicast transmission. The controller can transmit at least a portion of the common multicast transmission on the same resource on each serving cell 112. The controller 140 can transmit a pilot signal on each serving cell 112, the pilot signal related to the at least a portion of the common multicast transmission on each serving cell 112. The controller 140 can transmit an interfering signal and a related pilot on at least one different cell 114 from the serving cells 112.

For example, in a Multimedia Broadcast Multicast Service (MBMS), when one MBMS session begins, the controller 140 can perform counting to determine the user status of all the cells under the controller 140. If one cell has enough users, such as terminals 120, the cell can be a serving cell 112 and a broadcast mode can be established for the serving cell 112. The threshold for enough users may be a single user. If there are no users in a cell, such as in cells 114 and 116, the cell may not broadcast the data. A user, such as a terminal 112, can read Main Control Channel (MCCH) messages to determine if and how to combine a neighbor cell's 114 stream with its serving cell's 112 stream in order to obtain the diversity gain and/or the power gain.

To elaborate, in Enhanced MBMS (EMBMS), interference may only come from other cells. This can be a major bottleneck for system capacity. If the controller 140 can control the neighboring cells with largest average interference to broadcast the same data using the same Resource Element (RE) or at least not use that RE for other data transmissions, the interference level can be much reduced. This can significantly increase the system capacity. Thus, when the session begins, counting can be performed. Each cell can report its user status to the controller 140. These serving cells 112 form the service area. The controller 140 can then choose appropriate cells aside from the serving cells 112 that are the candidates for the strongest interference for the cells in the serving area. This cells form extended serving cells 114 in an extended serving area. The controller 140 can then control the extended serving cells 114 in the extended serving area to either broadcast the same data as the serving cells 112 in the serving area, in the case that cell power is available in an extended serving cell 114, or block the resource element that is used by an extended serving cell 114 in the case that cell power is unavailable at the extended serving cell 114. If the service area changes, such as by a user roaming, by a late joining user, or the like, during the session transmission, the controller 140 can adjust the extended serving area accordingly.

Figure 2:
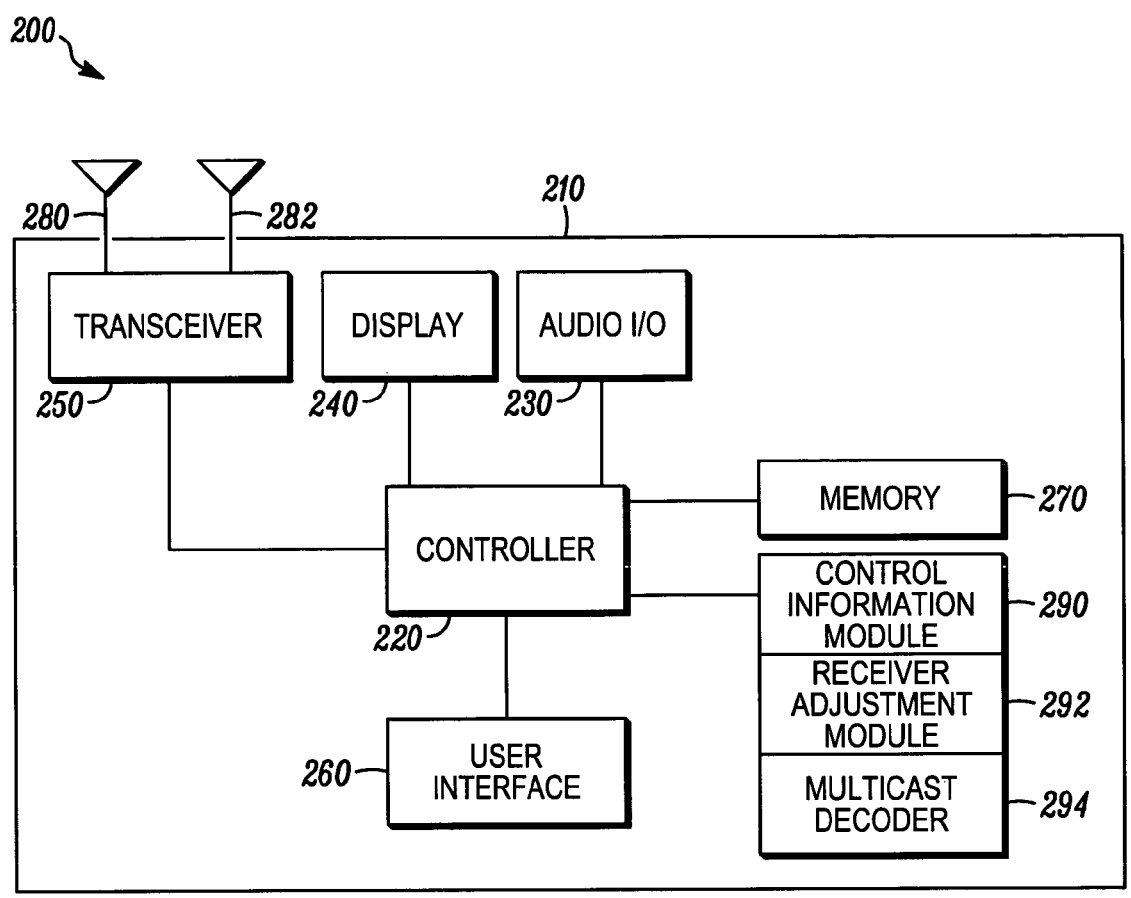
FIG. 2 is an exemplary block diagram of a wireless communication device according to one embodiment.

FIG. 2 is an exemplary block diagram of a wireless communication device 200, such as the terminal 120, according to one embodiment. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, and at least one antenna 280 coupled to the housing 210 and the transceiver 250. At least one other antenna 282 may be coupled to the transceiver 250 to create an antenna array. The wireless communication device 200 can also include a multicast registration module 290, a receiver characteristic adjustment module 292, and a multicast transmission decoder 294. The multicast registration module 290, the receiver characteristic adjustment module 292, and the multicast transmission decoder 294 can be coupled to the controller 220, can reside within the controller 220, can reside within the memory 270, can be autonomous modules, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory, a subscriber identity module memory, or any other memory that can be coupled to a wireless communication device.

In operation, the controller 220 can control the operations of the wireless communication device 200. The multicast registration module 290 can register for reception of a local multicast service on a serving cell. The transceiver 250 can receive information regarding at least one extended serving cell, the extended serving cell not including a wireless communication device desiring the local multicast service. The receiver characteristic adjustment module 292 can adjust at least one receiver characteristic of the wireless communication device transceiver 250 based on the information regarding the at least one extended serving cell. For example, the receiver characteristic adjustment module 294 can adjust at least one receiver characteristic based on the extended serving cell blocking a resource element related to transmission of the local multicast service on the serving cell. The receiver characteristic adjustment module 292 can also adjust at least one receiver characteristic by applying antenna adaptive algorithm weights for combining multiple antenna signals from the antennas 280 and 282.

In operation according to a related embodiment, the receiver in the transceiver 250 can receive information regarding serving cells that are transmitting a common multicast transmission. The receiver can also receive the common multicast transmission, at least a portion of which is transmitted on the same resource on multiple serving cells. The receiver can additionally receive a common broadcast pilot signal related to the common multicast transmission, the common broadcast pilot signal being common to multiple cells. The multicast transmission decoder 294 can decode the common multicast transmission. The receiver characteristic adjustment module 292 can adapt characteristics of the receiver in response to receiving the information regarding the serving cells. The antennas 280 and 282 can comprise an antenna array. The receiver characteristic adjustment module 292 can adapt the antenna array in response to receiving the information regarding the serving cells. A user interface can present the common multicast transmission to a user of the wireless device 200. For example, the common multicast transmission can be presented via the display 240, the audio input and output 230 and/or the user interface 260.

Figure 3:
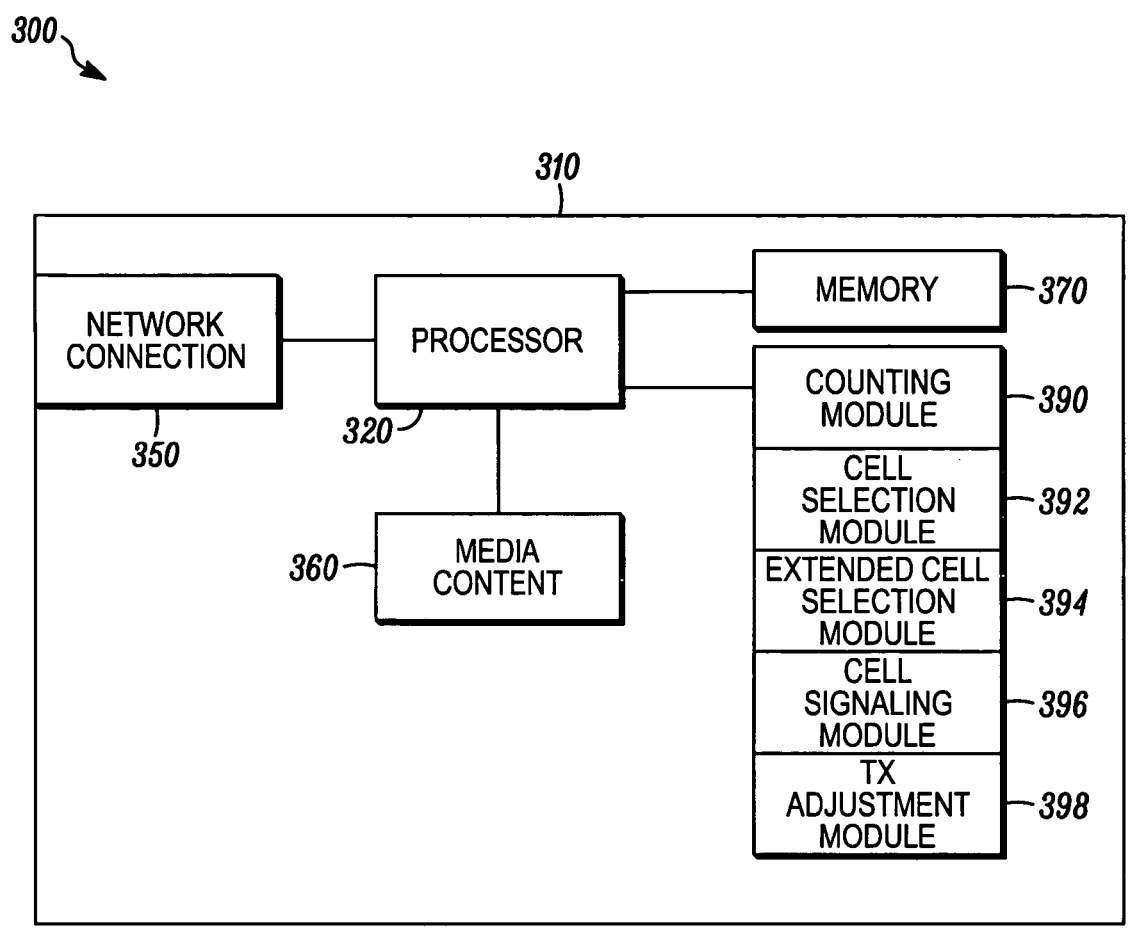
FIG. 3 is an exemplary block diagram of a controller according to one embodiment.

FIG. 3 is an exemplary block diagram of a controller 300, such as the network controller 140, according to one embodiment. The controller 300 can include a housing 310, a processor 320 coupled to the housing 310, a network connection 350 coupled to the processor 320, media content storage 360 coupled to the processor 320, and a memory 370 coupled to the processor 320. The media content storage 360 may be autonomous or may be located in the memory 370. The controller 300 can also include a counting module 390, a serving cell selection module 392, an extended serving cell selection module 394, a serving cell signaling module 396, and a transmission characteristic adjustment module 398. The counting module 390, the serving cell selection module 392, the extended serving cell selection module 394, the serving cell signaling module 396, and the transmission characteristic adjustment module 398 can reside within the controller 320, can reside within the memory 370, can be autonomous modules, can be software, can be hardware, or can be in any other format useful for a module on a controller. Also, each element of the controller 300 may be located at the network controller 140 or may be distributed throughout the network 110. For example, the media content 360 may be located at a media content provider, other elements may be located at different network controllers, and other elements may be located at different base stations on the network 110.

In operation, the processor 320 can control the operations of the controller 300. The counting module 390 can determine cells in which user equipment resides that desire a common multicast service. The serving cell selection module 392 can select at least one serving cell for transmitting the common multicast service, where the selection is based on the determination. The extended serving cell selection module 394 can select at least one extended serving cell from at least one serving cell neighbor cell which does not have user equipment that desires the common multicast service, the extended serving cell influencing transmissions on the serving cell. The extended serving cell selection module 394 can also select the at least one extended serving cell based on the at least one extended serving cell having a large average interference with the serving cell. The network connection 350 can send the common multicast service for transmission on the selected at least one serving cell.

The transmission characteristic adjustment module 398 can adjust transmission characteristics on the extended serving cell to influence the transmission of the common multicast service on the selected at least one serving cell. For example, the transmission characteristic adjustment module 398 can adjust the transmission characteristics to transmit the common multicast service on the extended serving cell to influence the transmission of the common multicast service on the selected at least one serving cell. As another example, the transmission characteristic adjustment module 398 can also block transmission on a resource of the extended serving cell, the resource influencing the transmission of the common multicast service on the selected at least one serving cell. The processor 320 can indicate, via the network connection 350, to user equipment on the selected at least one serving cell there is an unused resource on at least one neighbor cell. The processor 320 can also indicate, via the network connection 350, to the user equipment on the selected at least one serving cell, the physical resource used on the serving cell and indicate which extended serving cells block the same resource. The user equipment can then adjust receiver characteristics and/or antenna characteristics more efficiently based on the knowledge of transmission characteristics of the neighbor cells. The processor 320 can detect a change in a service area including serving cell and the extended serving cell selection module 394 can adjust an extended service area including the extended serving cell based on the processor 320 detecting the change.

In operation according to a related embodiment, the serving cell signaling module 396 can signal to user equipment a signal indicating the relationship between cells with respect to serving cells transmitting a common multicast transmission. The network connection 350 can send a signal for transmitting at least a portion of the common multicast transmission on the same resource on each serving cell. The network connection 350 send a signal for transmitting a pilot signal on each serving cell, the pilot signal related to the at least a portion of the common multicast transmission on each serving cell. The network connection 350 can send a signal for transmitting an interfering signal and a related pilot on at least one different cell from the serving cells. The pilot transmitted on each serving cell can be a phase reference for the common multicast transmission, and can be the same signal transmitted on multiple serving cells. The signal indicating the relationship between cells can indicate which cells are serving cells transmitting a common multicast transmission. The signal indicating the relationship between cells can also indicate the identity of a cell, such as an extended serving cell, that is transmitting on the same resource as the serving cells. The signal indicating the relationship between cells can additionally indicate the identity of a cell, such as an extended serving cell, that does not transmit on the same resource as the serving cells.

Figure 4:
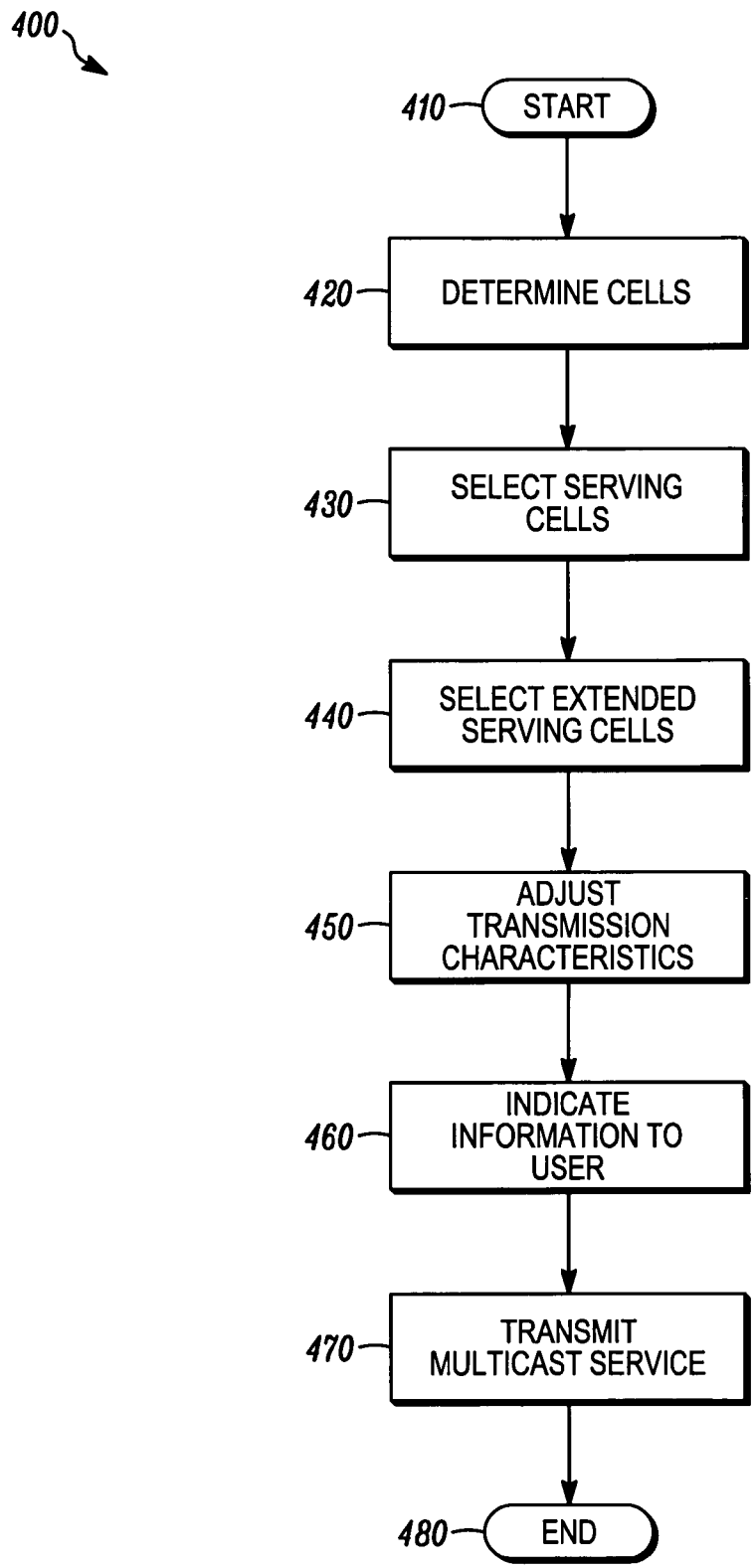
FIG. 4 is an exemplary flowchart illustrating the operation of a network controller according to one embodiment.

FIG. 4 is an exemplary flowchart 400 illustrating the operation of the network controller 140 according to another embodiment. In step 410, the flowchart begins. In step 420, the controller 140 can determine cells in which user equipment, such as terminals 120, reside that desire a common multicast service. In step 430, the controller 140 can select at least one serving cell 112 for transmitting the common multicast service, where the selection is based on the determination. In step 440, the network controller 140 can select at least one extended serving cell 114 from at least one serving cell 112 neighbor cell which does not have user equipment that desires the common multicast service, the extended serving cell influencing transmissions on the serving cell. Selecting at least one extended serving cell can include selecting the at least one extended serving cell 114 based on the at least one extended serving cell 114 having a large average interference with the serving cell 112.

In step 450, the controller 140 can adjust transmission characteristics on the extended serving cell 114 to influence the transmission of the common multicast service on the selected at least one serving cell 112. The controller 140 can adjust the transmission characteristics to transmit the common multicast service on the extended serving cell 114 to influence the transmission of the common multicast service on the selected at least one serving cell 112. The controller 140 can also adjust transmission characteristics to block transmission on a resource of the extended serving cell 114, the resource influencing the transmission of the common multicast service on the selected at least one serving cell 112. In step 460, the controller 140 can indicate to the user equipment 120 on the selected at least one serving cell 112 there is an unused resource on at least one neighbor cell. The controller 140 can also indicate, to the user equipment 120 on the selected at least one serving cell 112, the physical resource used on the serving cell and indicate which extended serving cells 114 block the same resource. The controller 140 can also signal the power of a transmitted physical channel on an extended serving cell 114 to the user equipment 120 on the selected at least one serving cell 112. In step 470, the controller 140 can transmit the common multicast service on the selected at least one serving cell 112. While transmitting the common multicast service, the controller 140 can detect a change in a service area including the serving cell 112 and adjust an extended service area including the extended serving cell 114 based on detecting the change. In step 480, the flowchart 400 ends.

Figure 5:
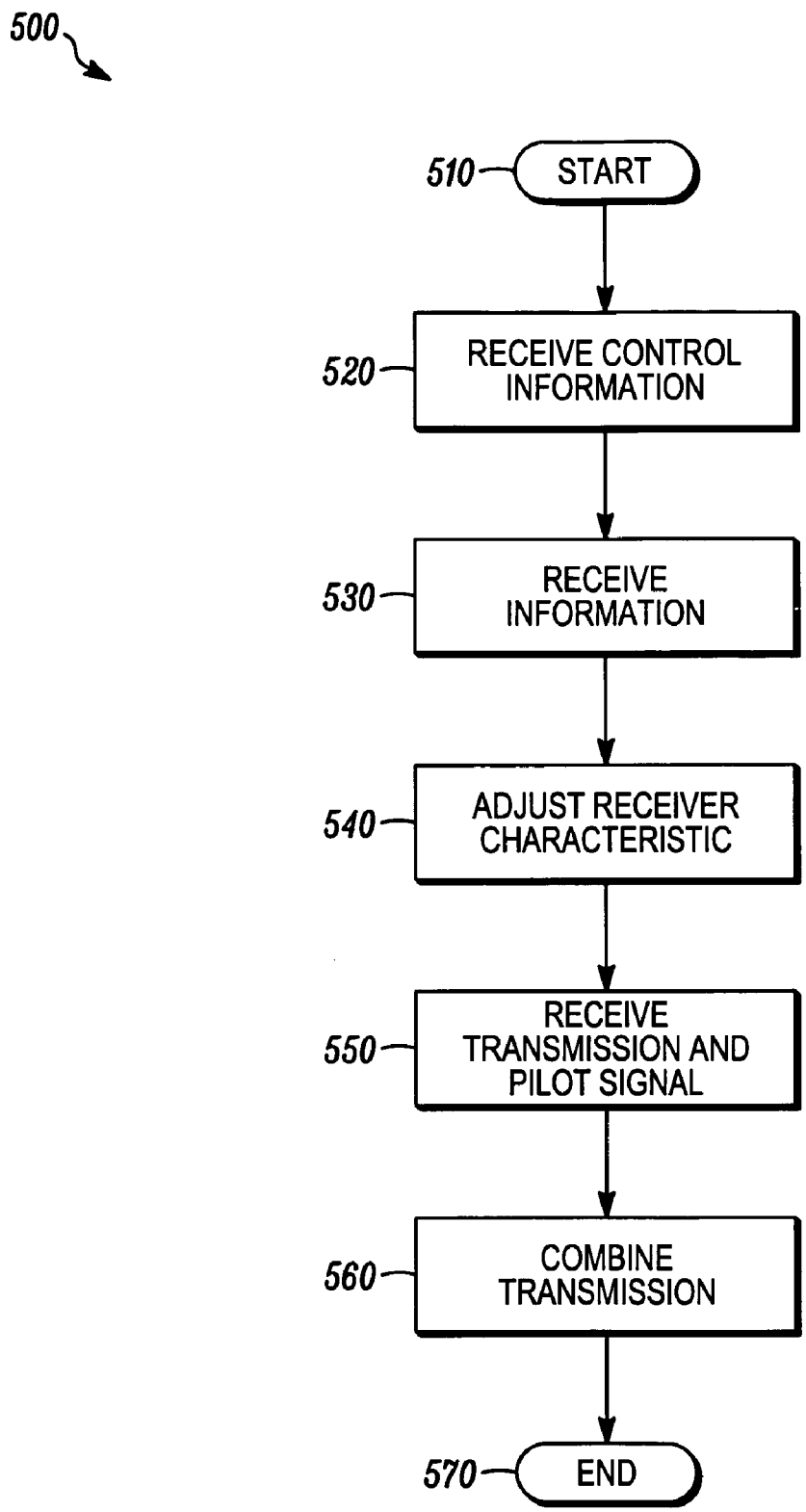
FIG. 5 is an exemplary flowchart illustrating the operation of a wireless communication device according to one embodiment.

FIG. 5 is an exemplary flowchart 500 illustrating the operation of a wireless communication device 200 according to another embodiment. In step 510, the flowchart begins. In step 520, the wireless communication device 200 can register for reception of a local multicast service on a serving cell 112. In step 530, the wireless communication device 200 can receive information regarding at least one extended serving cell 114, the extended serving cell 114 not including a wireless communication device desiring the local multicast service. In step 540, the wireless communication device 200 can adjust at least one receiver characteristic of the wireless communication device 200 based on the information regarding the at least one extended serving cell 114. Adjusting can include adjusting receiver characteristics based on the extended serving cell 114 blocking a resource element related to transmission of the local multicast service on the serving cell 112. Adjusting can additionally include applying antenna adaptive algorithm weights for combining multiple antenna signals. In step 550, the wireless communication device 200 can receive the common multicast transmission, can receive a common pilot signal from one base station, and can receive a broadcast pilot signal from multiple base stations. In step 560, the wireless communication device 200 can combine a transmission from the at least one extended serving cell 114 with a transmission from the serving cell 112. In step 570, the flowchart 500 can end.

Figure 6:
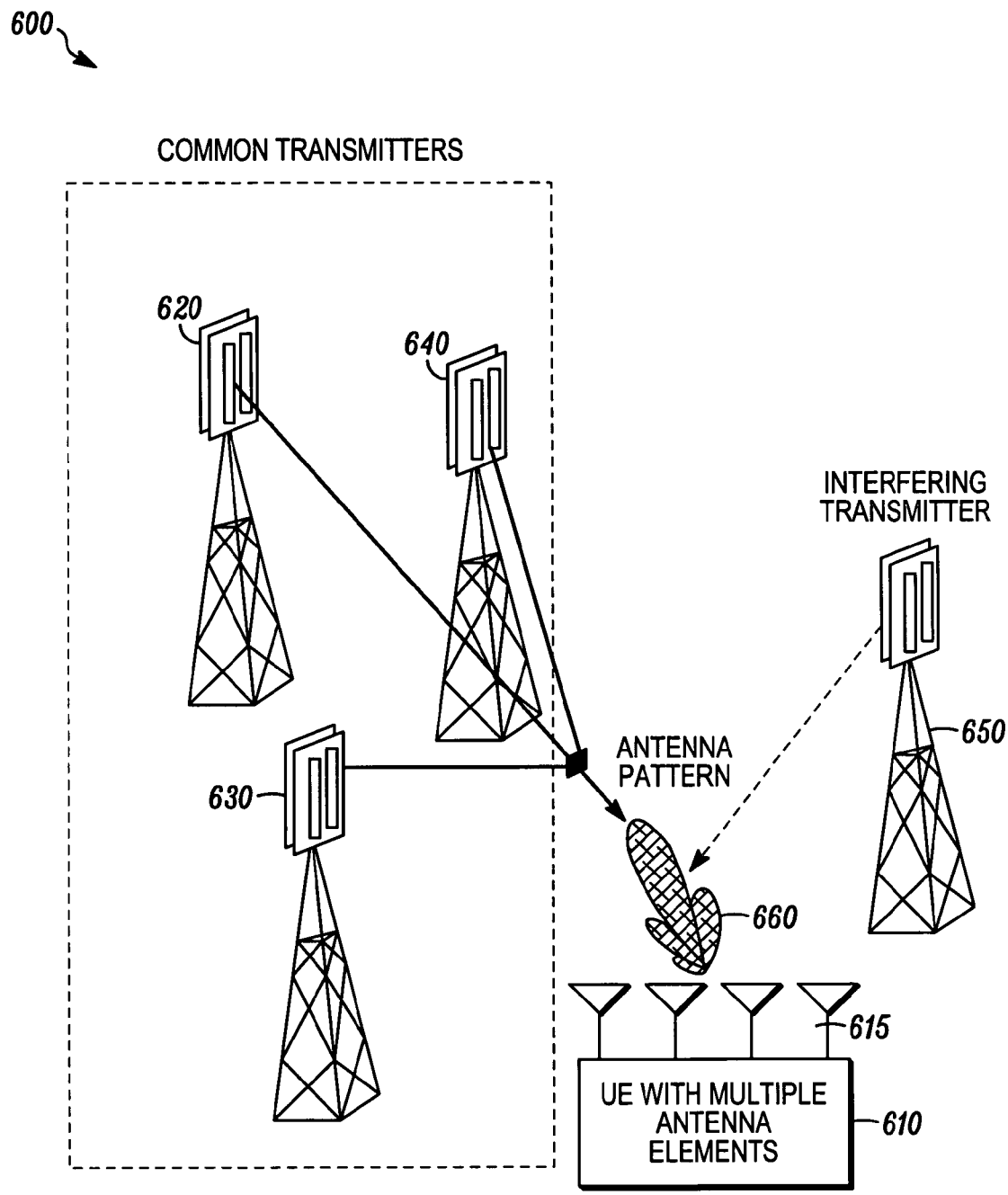
FIG. 6 is an exemplary illustration of a system according to another embodiment.

FIG. 6 is an exemplary illustration of a system 600, such as the system 100, according to another embodiment. The system 600 can include a terminal 610, such as a terminal 120, and base stations 620, 630, 640, and 650. The base stations 620, 630, and 640 may be located in serving cells 112. The base station 650 may be located in another cell 116 or an extended serving cell 114. The terminal 120 may be a wireless communication device 200 and can include an antenna array 615.

In operation, multicasting radio systems can transmit the same signal from different cells or sites, such as base stations 620, 630, and 640 in order to improve coverage. If a pilot is used for channel estimation purposes, the pilot portion of the transmitted signal can be normally transmitted in a similar or the same way as the data traffic so that the channel affecting data may be estimated from the pilot. For example, the pilot and data can be transmitted on similar antenna patterns, on similar frequencies, at close times, etc. This similarly transmitted pilot or "common broadcast pilot" may then be used to determine the channel that the data portion of the transmitted signal passes through, and so may be used in a receiver to decode the data.

The terminal 610 may adapt its receiver to maximize the received signal to noise ratio (SNR) of a desired signal, or it may maximize the received signal to interference and noise ratio (SINR). Since the performance of a cellular radio telecommunication system is typically limited by interference, maximizing SINR generally gives better performance than maximizing SNR. A multiple antenna terminal 610 can be particularly effective at maximizing SINR, as it can adapt its antenna patterns such that the pattern magnitude is large in the direction of the desired transmission, and small in the direction of an interfering transmission. According to one embodiment, the present disclosure support these maximum SINR receivers.

A maximum SNR receiver, such as a maximum ratio combining receiver, is described to contrast its operation with maximum SINR receivers. An illustrative case is where the channel impulse response from a base station antenna 620 to a terminal 610 may be modeled as a single complex coefficient, which can be known as "flat Rayleigh fading." This flat fading model can be appropriate for narrow band transmissions, such as those often found in Frequency Division Multiple Access (FDMA) or Orthogonal Frequency Division Multiplexing (OFDM) systems, as well as in certain radio propagation environments. In these systems and environments, multicasting base stations 620, 630, etc. may transmit the same signal at approximately the same times to the terminal 610, so that when they are sufficiently synchronized the transmissions can combine such that they appear to be a single transmission traveling through a channel that is the sum of the individual channels. The signal received from N of these multicasting transmitters at a terminal 610 with M antennas when both noise and interfering signals are present may be expressed as:

$$r = \left(\sum_{i=1}^{N} h_i\right)x + n + \left(\sum_{j=1}^{L} g_j y_j\right) \equiv h_d x + Gy + n$$

Where:
r is an (M×1) column vector of the received signals and noise at each of the M terminal antennas from the N antennas transmitting the common desired signal
$h_i$ is an (M×1) column vector of the channel impulse response between the ith (of N) antennas transmitting a desired signal and each of the terminal's antennas
$g_j$ is an (M×1) column vector of the channel impulse response between the jth (of L) antennas transmitting an interfering signal and each of the terminal's antennas. Each $g_j$ may be estimated from a pilot transmitted in the same way as the interfering signal, $y_j$.
$h_d$ is an (M×1) column vector of the composite channel impulse response affecting the transmitted signal and it may be estimated from the common broadcast pilot.
G is an (M×L) matrix, each column containing a $g_j$
n is an (M×1) column vector of the noise at each of the M UE antennas
x is the desired common transmitted signal from multiple base station antennas
$y_j$ is the jth interfering signal
y is an (L×1) column vector of the interfering signals When a terminal's antenna array combiner with weights w is used to combine the received signals, r, the combiner output may be expressed:

$$z = w^H r$$

When we use the common assumption that the noise power on the received antennas 615 is the same, the received SINR, γ, at the antenna array combiner output, z, may be expressed as:

$$\gamma = \frac{w^H R_{dd} w}{w^H (R_{II} + \sigma_n^2 I) w}$$

Where:
$\sigma_n^2$ is the noise power
$x^H$ is complex conjugate transpose (the "Hermitian" transpose) of x
$R_{dd} \equiv h_d h_d^H$; and $R_{II} \equiv GG^H$ A maximum ratio receiver matches the array combining weights to the composite channel, so in this case:

$$w = h_d$$

Since the maximum ratio combining receiver only needs estimates of the composite channel impulse response, $h_d$, in this case the terminal 610 does not need to estimate the channel impulse responses of the interference. However, maximum ratio combining receivers are only optimal in the presence of uncorrelated noise; so when correlated interference is present (i.e., when off diagonal elements of $R_{dd}$ are not zero), other receivers such as a minimum mean squared error (MMSE) receiver can have better performance. The MMSE receiver uses array combining weights that take the form:

$$w = (R_{II} + \sigma_n^2 I)^{-1} h_d$$

$R_{II}$ may be calculated as above using estimates of $g_j$, since each $g_j$ may be estimated from a pilot transmitted in the same way as the interfering signal, $y_j$. Terminals typically need to know the identities (spreading sequences, scrambling codes, OFDM subcarriers, or the like) of the pilots used by the interfering transmitters, so that the $g_j$ may be estimated. This information may be signaled to the terminal 610, or may be known apriori by the terminal 610. When the information is signaled to the terminal 610, it is often desirable to provide the signaling about multiple interfering cells on a serving cell. This avoids the complexity involved when the terminal 610 receives control signaling from multiple cells. If the terminal 610 does not know the identities of the pilots used by the interfering transmitters, or if the pilots are not transmitted in the same way as the interfering signal (i.e., they are not "phase references" for the interfering signals), it can be difficult for the terminal 610 to use the interfering pilots to determine MMSE combining weights.

Terminals often typically have to know which cells are transmitting interference to calculate $R_{II}$. This information can be especially important when the network does not transmit interference on a cell near a terminal 610, since that nearby cell would otherwise likely be a strong interference source, and the terminal 610 would likely adapt its antenna pattern to attenuate it (reducing its ability to attenuate other interferers or to receive the desired common transmission). The network may therefore signal which cells do not transmit on a given channel, and so will not interfere with a common transmitted signal. Also, as indicated above, the terminal 610 can either be signaled identities of pilots that may be used as phase references for interfering signals, or the network transmissions can be constrained such that the terminal 610 knows the identities apriori.

It is also useful for the terminal 610 to know which cells are those that are transmitting a common transmitted signal, so that they will not be considered as one of those providing interference (and therefore one of the L transmitters contributing to the interference terms in $R_{II}$). This determination can be difficult when only common broadcast pilot is used, since the N common broadcast pilots from the N transmitters combine "in the air" to form a single received signal which reduces the identifiability of the individual transmitters. Therefore, the network may signal on a serving cell if a nearby cell is one of those transmitting a common transmitted signal.

This knowledge of desired and interfering transmitters and their related pilots can enable improved terminal SINR performance over the case where only a common broadcast pilot is used (and where interference can not be controlled as effectively).

The system 600 further illustrates the use of desired and interfering transmitter and pilot information for the case where a maximum SINR receiver is used. The terminal's antenna pattern 615 can be adapted to be large in the direction of the combined transmission, while it is small in the direction of the interfering transmitter 650. The combined transmission can appear to the terminal 610 to be from a single transmitter and is illustrated as coming from a single direction. While this is not required in the most literal sense, since adaptive arrays are capable of using a single degree of freedom to adapt to a coherent transmission such as the combined transmission contemplated in the preferred embodiment, it is reasonable for the purposes of illustration in the system 600.

Figure 7:
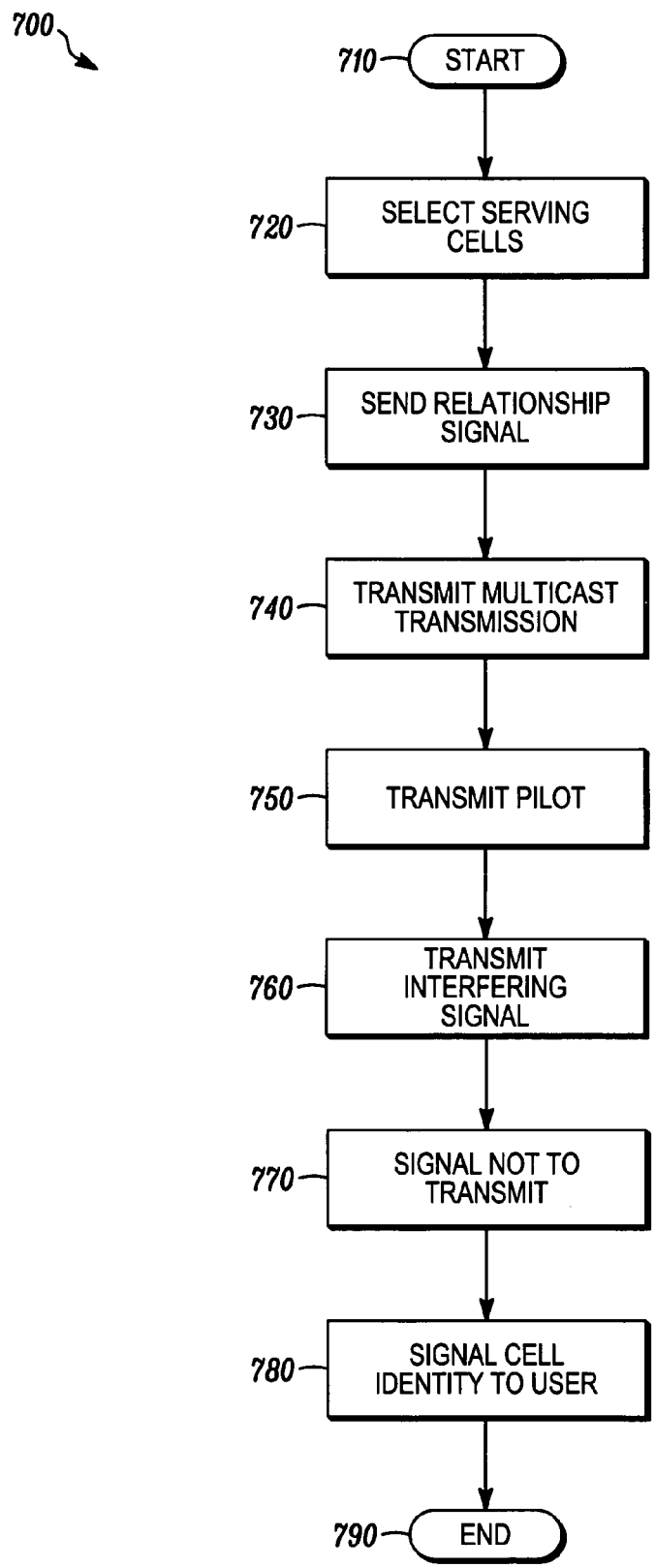
FIG. 7 is an exemplary flowchart illustrating the operation of a network controller according to another embodiment.

FIG. 7 is an exemplary flowchart 700 illustrating the operation of the network controller 140 according to another embodiment. In step 710, the flowchart begins. In step 720, the controller 140 can determine cells in which user equipment, such as terminals 120, reside that desire a common multicast service and select at least one serving cell 112 for transmitting the common multicast service. In step 730, the controller 140 can send a signal to user equipment indicating the relationship between cells with respect to serving cells 112 transmitting a common multicast transmission. The signal can be a signal indicating which cells are serving cells 112 transmitting a common multicast transmission and/or a signal indicating the identity of another cell, such as an extended serving cell 114, which is transmitting on the same resource as the serving cells. In step 740, the controller 140 can transmit at least a portion of the common multicast transmission on the same resource on each serving cell 112. The common multicast transmission can be determined from a single information stream, such as from a media content server, for broadcast to multiple users at multiple locations. The common multicast transmission can be transmitted on the serving cells 112 using the same physical layer attributes on each serving cell 112. The same physical layer attributes can be the same spreading, the same channel coding, the same error correction coding, the same time frequency resources, the same frequency hopping pattern, and the like. In step 750, the controller 140 can transmit a pilot signal on each serving cell 112, the pilot signal related to the at least a portion of the common multicast transmission on each serving cell 112. The pilot transmitted on each serving cell 112 can be a phase reference for the common multicast transmission and can be the same signal transmitted on multiple serving cells 112. In step 760, the controller 140 can transmit an interfering signal and a related pilot on at least one different cell from the serving cells, such as an extended serving cell 114. In step 770, the controller 140 can signal to a transmitting base station an indicator indicating not to transmit on a resource on a non-serving cell, such as on an extended serving cell 114. In step 780, the controller 140 can signal to user equipment the identity of a cell, such as an extended serving cell 114, which does not transmit on the same resource as the serving cells. The same resource on each serving cell 112 can be the same slot, the same frequency, the same period, the same Walsh codes, and the like on each serving cell 112. In step 790, the flowchart 700 can end.

Figure 8:
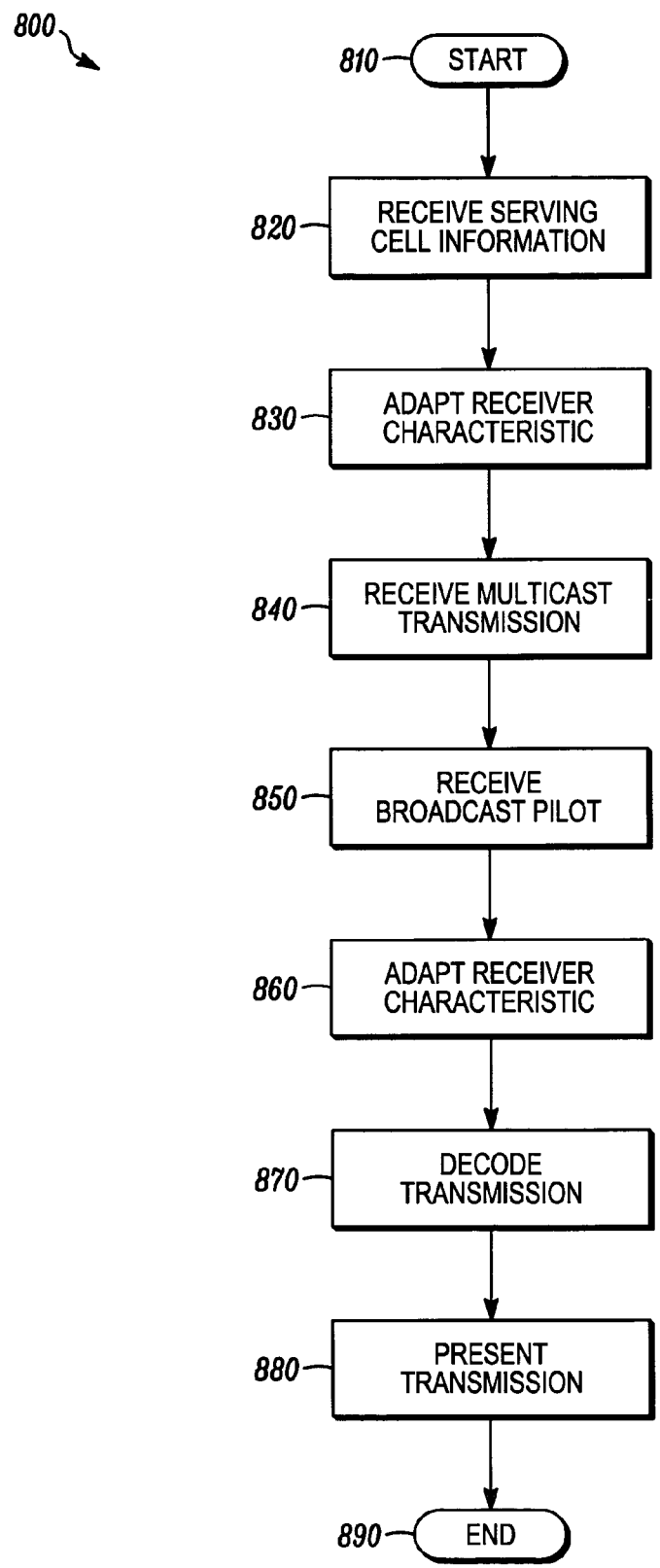
FIG. 8 is an exemplary flowchart illustrating the operation of a wireless communication device according to another embodiment.

FIG. 8 is an exemplary flowchart 800 illustrating the operation of a wireless communication device 200 according to another embodiment. In step 810, the flowchart begins. In step 820, the wireless communication device 200 can receive information regarding serving cells 112 that are transmitting a common multicast transmission. In step 830, the wireless communication device 200 can adapt a receiver characteristic in response to receiving the information regarding the serving cells 112. For example, the wireless communication device 200 can adapt a receiver or an antenna array in response to receiving the information regarding the serving cells 112. As a further example, the wireless communication device 200 can attenuate an interfering signal by adapting its receiver to attenuate interference using the information regarding serving cells. In step 840, the wireless communication device 200 can receive the common multicast transmission, at least a portion of which is transmitted on the same resource on multiple serving cells 112. In step 850, the wireless communication device 200 can receive a common broadcast pilot signal related to the common multicast transmission, the common broadcast pilot signal being common to multiple cells. In steps 840 and 850, the wireless communication device 200 can also receive an interfering signal and a related pilot from a different cell 114 from the serving cells 112. In step 860, the wireless communication device 200 can adapt a receiver characteristic in response to receiving the broadcast pilot. For example, the wireless communication device 200 can adapt a receiver or an antenna array in response to receiving the broadcast pilot. As a further example, the wireless communication device 200 can attenuate an interfering signal by adapting the receiver to attenuate interference using the information regarding serving cells and the common broadcast pilot signal and the pilot related to the interfering signal. In step 870, the wireless communication device 200 can decode the common multicast transmission. In step 880, the wireless communication device 200 can present the common multicast transmission to a user of the wireless device via a user interface. In step 890, the flowchart 800 can end.

Thus, the present disclosure can provide neighbor assisted localized multicast. For example, when a session starts, counting can be performed by a network. Counting can be performed by having each cell report its user status, such as radio bearer status to a controller such as a Radio Network Controller. The cells that have users desiring a multicast session can form a service area. The controller can choose appropriate cells except the cells in the serving area, which are the candidates for the strongest interference for the cells in the serving area. These cells can form an extended serving area. The controller can control the cells in the extended serving area to either broadcast the same data as the cells in the serving area, in the case that cell power is available or block resource element that is used by the cell in the serving area, in the case that cell power is unavailable. The service area may change by a user moving between cells, by a user joining a session after it starts, or by any other similar event. If the service area changes during the session transmission, the controller may adjust the extended serving area as well.

The present disclosure can allow interference to be more finely controlled than existing simulcast or single frequency networks. For example, both the coverage area and interference sources can be explicitly controlled. This can allow greater spectral efficiency per unit area and better coverage due to the precise control over interference and a terminal's knowledge of desired and interfering sources. For example, a controller can signal information on which neighbor cells have reserved and are not transmitting on a physical layer resource, such as a channel, that a serving cell is transmitting on. This information can allow the terminal to configure an optimum receiver in the terminal. The controller can also signal which neighbor cells are transmitting on an identical physical layer resource, such as a channel, that a serving cell is transmitting on. For example an identical physical layer resource can mean that the signals are transmitted such that when the channel combines the signals from any two cells, the terminal cannot distinguish the transmissions from the two cells when the channels are within a scale factor of each other. This can use identical scrambling, spreading, interleaving, or the like. The controller can signal the information above on the serving cell.

The method of this disclosure is preferably implemented on a programmed processor. However, the controllers, flowcharts, and modules may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

What is claimed is:

1. A method in a wireless network, the method comprising:

signaling to user equipment a signal indicating the relationship between at least one cell with respect to at least one serving cell transmitting a common multicast transmission;

transmitting at least a portion of the common multicast transmission on the same resource on the at least one serving cell; and transmitting a pilot signal on the at least one serving cell, the pilot signal related to the at least a portion of the common multicast transmission on the at least one serving cell;

wherein a cell different from the at least one serving cell transmits an interfering signal and a related pilot.

2. The method according to claim 1, wherein the signal is selected from the group of a signal indicating which cells are serving cells transmitting a common multicast transmission and a signal indicating the identity of a cell that is transmitting on the same resource as the serving cells.

3. The method according to claim 2, wherein the pilot transmitted on the at least one serving cell is a phase reference for the common multicast transmission, and is the same signal transmitted on multiple serving cells.

4. The method according to claim 2, wherein the common multicast transmission is transmitted on the serving cells using the same physical layer attributes on the at least one serving cell.

5. The method according to claim 4, wherein the same physical layer attributes comprises at least one selected from the group of the same spreading, the same channel coding, the same error detection coding, the same time frequency resources, and the same frequency hopping pattern.

6. The method according to claim 2, further comprising signaling to a transmitting base station an indicator indicating not to transmit on a resource on a non-serving cell.

7. The method according to claim 2, further comprising signaling to user equipment the identity of a cell that does not transmit on the same resource as the serving cells.

8. The method according to claim 2, wherein the same resource on the at least one serving cell comprises at least resource one selected from the group of the same slot, the same frequency, the same period, and the same spreading codes, on the at least one serving cell.

9. The method according to claim 2, wherein the common multicast transmission is determined from a single information stream for broadcast to multiple users at multiple locations.

10. A method in a wireless device, the method comprising:
   receiving information regarding serving cells that are transmitting a common multicast transmission;
   receiving the common multicast transmission, at least a portion of which is transmitted on the same resource element on multiple serving cells;
   receiving a common broadcast pilot signal related to the common multicast transmission, the common broadcast pilot signal being common to multiple cells;
   decoding the common multicast transmission; and
   receiving an interfering signal and a related pilot from a different cell from the serving cells.

11. The method according to claim 10, further comprising adapting a receiver in response to receiving the information regarding the serving cells.

12. The method according to claim 10, further comprising presenting the common multicast transmission to a user of the wireless device via a user interface.

13. The method according to claim 10, further comprising attenuating the interfering signal by adapting the receiver to attenuate interference using the information regarding serving cells and the common broadcast pilot signal and the pilot related to the interfering signal.

14. A network controller comprising:
   a processor configured to control the operations of the network controller;
   a serving cell signaling module coupled to the processor configured to signal to user equipment a signal indicating the relationship between cells with respect to serving cells transmitting a common multicast transmission; and
   a network connection coupled to the processor the network connection configured to send a signal for transmitting at least a portion of the common multicast transmission on the same resource element on each serving cell, the network connection configured to send a signal for transmitting a pilot signal on each serving cell, the pilot signal related to the at least a portion of the common multicast transmission on each serving cell, the network connection configured to send a signal for transmitting an interfering signal and a related pilot on at least one different cell from the serving cells.

15. The network controller according to claim 14, wherein the pilot transmitted on at least one serving cell is a phase reference for the common multicast transmission, and is the same signal transmitted on multiple serving cells.

16. The network controller according to claim 14, wherein the signal indicating the relationship between cells indicates which cells are serving cells transmitting a common multicast transmission.

17. The network controller according to claim 14, wherein the signal indicating the relationship between cells indicates the identity of a cell that is transmitting on the same resource as the serving cells.

18. The network controller according to claim 14, wherein the signal indicating the relationship between cells indicates the identity of a cell that does not transmit on the same resource as the serving cells.

* * * * *